(12) United States Patent
Honda

(10) Patent No.: US 9,246,297 B2
(45) Date of Patent: Jan. 26, 2016

(54) GAS LASER OSCILLATOR CONTROLLING ADJUSTED LEVEL OF LASER POWER SUPPLY

(71) Applicant: FANUC CORPORATION, Minamitsuru-gun, Yamanashi (JP)

(72) Inventor: Masahiro Honda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/629,734

(22) Filed: Feb. 24, 2015

(65) Prior Publication Data

US 2015/0244138 A1 Aug. 27, 2015

(30) Foreign Application Priority Data

Feb. 27, 2014 (JP) ................... 2014-036807

(51) Int. Cl.
  *H01S 3/038* (2006.01)
  *H01S 3/032* (2006.01)
  *H01S 3/034* (2006.01)
  *H01S 3/036* (2006.01)
  *H01S 3/04* (2006.01)
  *H01S 3/041* (2006.01)

(52) U.S. Cl.
  CPC .............. *H01S 3/0384* (2013.01); *H01S 3/034* (2013.01); *H01S 3/036* (2013.01); *H01S 3/0323* (2013.01); *H01S 3/041* (2013.01); *H01S 3/0407* (2013.01)

(58) Field of Classification Search
  CPC ..... H01S 3/0384; H01S 3/036; H01S 3/0407; H01S 3/0323; H01S 3/034; H01S 3/04
  See application file for complete search history.

(56) References Cited

U.S. PATENT DOCUMENTS

| 4,507,266 A | 3/1985 | Satoh et al. |
| 2007/0047610 A1* | 3/2007 | Egawa et al. ................... 372/55 |
| 2013/0016747 A1* | 1/2013 | Honda et al. ............... 372/38.02 |

FOREIGN PATENT DOCUMENTS

| JP | 58455643 | 9/1983 |
| JP | 02055686 | 2/1990 |
| JP | 02075487 | 3/1990 |
| JP | 02235588 | 9/1990 |
| JP | 04259277 | 9/1992 |
| JP | 3157470 | 5/1998 |

* cited by examiner

*Primary Examiner* — Xinning Niu
(74) *Attorney, Agent, or Firm* — RatnerPrestia

(57) ABSTRACT

A gas laser oscillator including discharge tubes, main discharge electrodes, auxiliary electrodes, an output mirror which outputs a laser, and a mechanical shutter which cuts off the laser output from the output mirror. To maintain the auxiliary discharge in the state where the laser output is zero, the base discharge command is set to a first command value when the mechanical shutter is closed, and is set to a second command value smaller than the first command value when the mechanical shutter is opened.

2 Claims, 3 Drawing Sheets

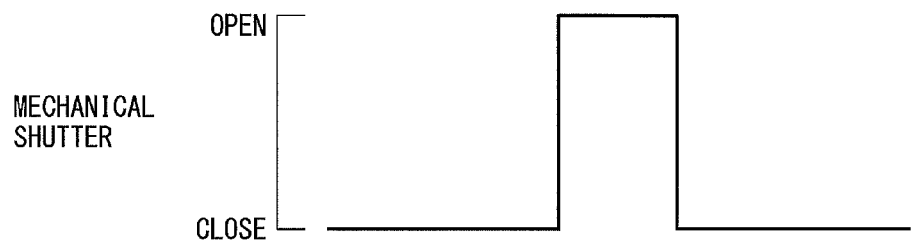
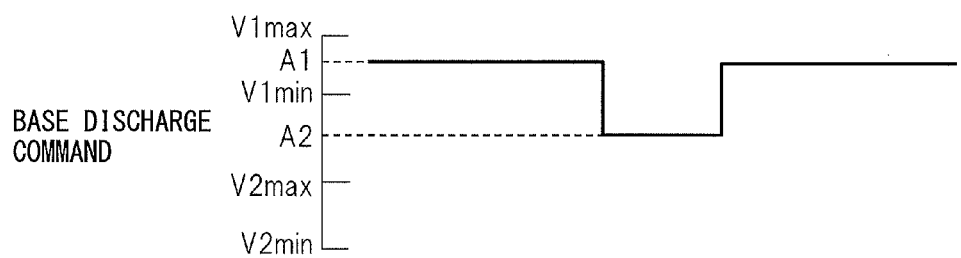
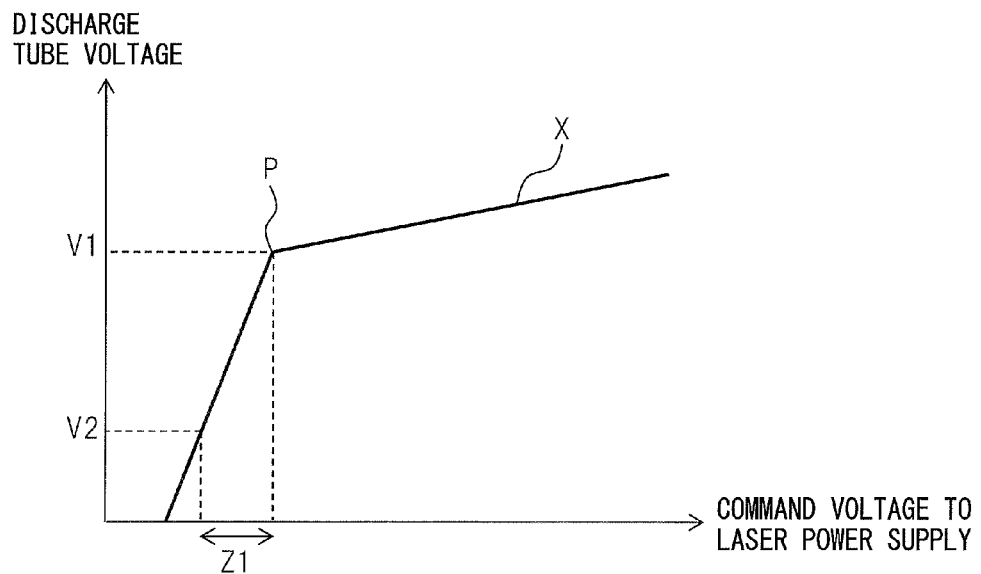

GAS LASER OSCILLATOR CONTROLLING ADJUSTED LEVEL OF LASER POWER SUPPLY

BACKGROUND OF THE INVENTION

1. Field of the Invention

The present invention relates to a gas laser oscillator which controls the adjusted level of a laser power supply.

2. Description of the Related Art

To drill high grade holes or stably cut a workpiece, an induction discharge excitation type gas laser oscillator is used. A gas laser oscillator mainly includes a plurality of discharge tubes through which a laser gas circulates, a plurality of main discharge electrodes which are arranged corresponding to the plurality of discharge tubes and make main discharge start for discharge excitation of the laser gas, and a plurality of auxiliary electrodes which are arranged adjoining the plurality of main discharge electrodes and make auxiliary discharge start in the laser gas in a state lower than the output at which main discharge starts.

In this connection, FIG. 3A to FIG. 3C are views which show the relationship X between the command voltage and discharge tube voltage. In these figures, the abscissa shows a command voltage to a laser power supply, while the ordinate shows the voltage of the discharge tubes.

In FIG. 3A, the discharge tube voltage linearly increases sharply from 0 kV until the point P and, when reaching the point P, linearly increases gradually. This point P corresponds to the main discharge extinction level V1. If the discharge tube voltage is smaller than this value, the main discharge extinguishes. When the discharge tube voltage exceeds the main discharge extinction level V1, the main discharge is started and the laser is output. As will be understood from FIG. 3A, the auxiliary discharge extinction level V2 is smaller than the main discharge extinction level V1.

In this connection, a command which is necessary for maintaining auxiliary discharge in the state where the laser output is 0 W will be called a "base discharge command". In FIG. 3A, the base discharge command is adjusted in the zone Z1 between the main discharge extinction level V1 and the auxiliary discharge extinction level V2. Further, the laser output command, which is determined in accordance with the laser power which the gas laser oscillator demands, is added to the base discharge command and output from the output command device to the laser power supply.

If the gas laser oscillator cools and for example the laser gas temperature falls from 7° C. to about 47° C., as shown in FIG. 3B by the broken line, the relationship X shifts in the upward direction. Along with this, the main discharge extinction level V1 and the auxiliary discharge extinction level V2 respectively rise to the main discharge extinction level V1max and the auxiliary discharge extinction level V2max. For this reason, when setting the base discharge command to the auxiliary discharge extinction level V2, the auxiliary discharge may extinguish.

In such a state, if the command voltage to the laser power supply is increased, a situation can arise where impedance matching is not possible between the laser power supply and the discharge load. As a result, a large voltage is applied to the discharge tubes, excessive current flows to the laser power supply, and the discharge tubes and laser power supply may break.

As opposed to this, if the gas laser oscillator is warm and for example the laser gas temperature becomes 127° C. or more, as shown in FIG. 3C by the one-dot chain line, the relationship X shifts in the downward direction. Along with this, the main discharge extinction level V1 and the auxiliary discharge extinction level V2 respectively fall to the main discharge extinction level V1min and the auxiliary discharge extinction level V2min. When the main discharge extinction level V1 falls down to the main discharge extinction level V1min, even if the laser output is controlled to become 0 W, the main discharge is prevented from extinguishing.

In such a state, if opening the mechanical shutter which is provided at the front of the output mirror of the gas laser oscillator, laser light is unnecessarily output to the workpiece and the workpiece surface may be damaged. Normally, the speed of opening and closing of the mechanical shutter is relatively slower by about several seconds, so the adjusted level of the base discharge is set so that such processing defects do not arise. Setting such an adjusted level of the base discharge will be called an "electric shutter". An electric shutter is also disclosed in Japanese Patent No. 3157470 and Japanese Patent Publication No. 58-155643A.

However, the adjusted level for maintaining auxiliary discharge and the adjusted level for realizing the electric shutter are in a mutually opposite relationship. Therefore, even if the gas laser oscillator is cold, it is difficult to maintain the auxiliary discharge and even if the gas laser oscillator is warm, it is also difficult to realize an electric shutter.

Further, in Japanese Patent No. 3157470, in the instant when making the laser output command zero, it is necessary to lower the base discharge command by exactly a predetermined value. Furthermore, the laser output command and the base discharge command which are transmitted from the CNC to the communication use IC are asynchronous and the delay times of the processing circuits thereof also differ. For this reason, a circuit for obtaining synchronization, for example, a latch circuit, becomes necessary. The cost increases and the processing of the software for control becomes complicated.

Furthermore, when the laser output command and the base discharge command cannot be perfectly synchronized, the commands become discontinuous. As a result, processing defects of the workpiece may occur. Further, in Japanese Patent No. 3157470, the base discharge command is made to descend from a predetermined value to realize an electric shutter. For this reason, depending on the amount of drop or the time setting, sometimes the effect of the electric shutter cannot be obtained or the auxiliary discharge may extinguish.

Further, in the configuration of Japanese Patent Publication No. 58-155643A, a power source for main discharge and a power source for auxiliary electrode use are provided. These are independently controlled. In this case, there are the problems that it is necessary to separately prepare a power source for auxiliary electrode use and the cost increases.

The present invention was made in consideration of such a situation and has as its object the provision of a gas laser oscillator which maintains auxiliary discharge even in a cold state while able to realize an electric shutter even in a warm state.

SUMMARY OF INVENTION

To achieve the above object, according to a first aspect, there is provided a gas laser oscillator comprising a plurality of discharge tubes through which a laser gas circulates, a plurality of main discharge electrodes which are arranged corresponding to the plurality of discharge tubes and which make main discharge start for discharge excitation of the laser gas, a plurality of auxiliary electrodes which are arranged adjoining that plurality of main discharge electrodes and which make auxiliary discharge start in the laser gas in a state lower than the output by which the main discharge starts, an output mirror which outputs a laser which is oscillated at the plurality of discharge tubes, and a mechanical shutter which cuts off the laser output from that output mirror, wherein a base command for maintaining the auxiliary discharge in the state where the laser output is zero is set to a first command value when the mechanical shutter is closed and is set to a second command value smaller than the first command value when the mechanical shutter is opened.

According to a second aspect, there is provided the first aspect wherein the first command value is a value between a maximum value and a minimum value of a main discharge extinction level, and the second command value is a value of a minimum value of a main discharge extinction level and a maximum value of an auxiliary discharge extinction level.

These and other objects, features, and advantages of the present invention will become clearer from the detailed description of typical embodiments of the present invention which are shown in the attached drawings.

BRIEF DESCRIPTION OF THE DRAWINGS

FIG. 2 is a time chart of a mechanical shutter and base discharge command of a gas laser oscillator according to the present invention.

FIG. 3A is a view which shows a relationship between a command voltage to a laser power supply and a discharge tube voltage.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
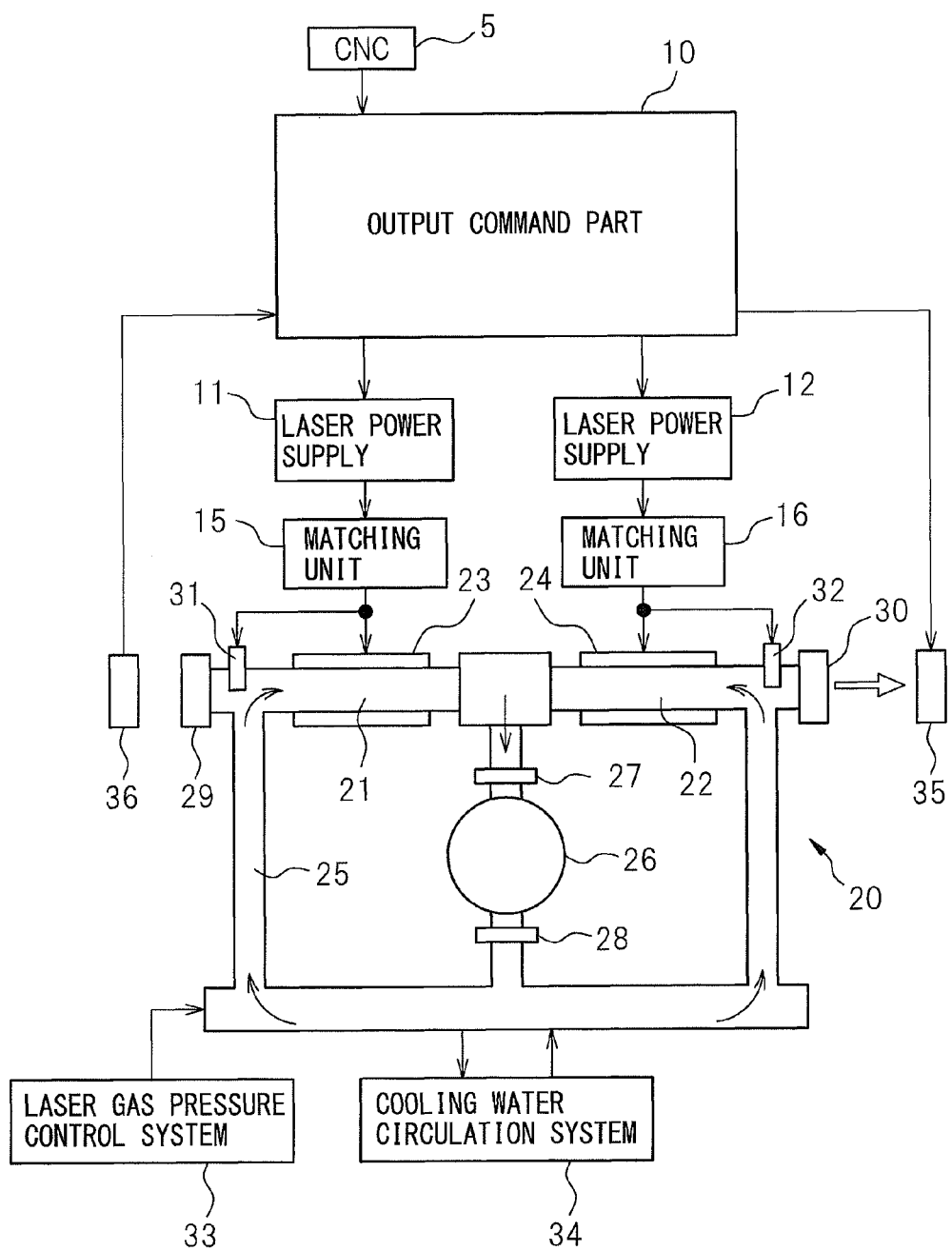
FIG. 1 is a schematic view of a gas laser oscillator according to the present invention.

FIG. 1 is a schematic view of a gas laser oscillator according to the present invention. The gas laser oscillator 20 in the present invention is a discharge excitation type relatively high output gas laser oscillator. The laser light which is output from the gas laser oscillator 20 is used for processing a workpiece (not shown) in a not shown laser processing system.

As illustrated, the laser gas circulation path 25 of the gas laser oscillator 20 includes discharge tubes 21, 22. This laser gas circulation path 25 is connected to the laser gas pressure control system 33 and supplies and discharges laser gas in the laser gas pressure control system 33 so as to control the pressure of the laser gas circulation path 25.

Further, at the laser gas circulation path 25, a turbo blower 26 is arranged. Upstream and downstream of the turbo blower 26, heat exchangers 27, 28 are arranged respectively. Furthermore, the gas laser oscillator 20 is connected to a cooling water circulation system 34. Due to this, the laser gas in the laser gas circulation path 25, in particular the laser gas in the discharge tubes 21, 22 etc., is suitably cooled.

As shown in FIG. 1, one end of the discharge tube 21 is provided with a rear mirror 29 (resonator internal mirror) of a partial reflection mirror, while the other end of the discharge tube 22 is provided with an output mirror 30 of the partial reflection mirror. The output mirror 30 is formed from ZnSe, while the inside surface of the output mirror 30 is coated by a partial reflective coating and the outside surface of the output mirror 30 is coated with an antireflective coating. Further, at the back surface of the rear mirror 6, a laser power sensor 36 is arranged.

The above-mentioned two discharge tubes 21, 22 are positioned at the inside of the light resonation space between the rear mirror 29 and output mirror 30. The discharge tubes 21, 22 are sandwiched by a pair of main discharge electrodes 23, 24. These main discharge electrodes 23, 24 are metalized or have metal members attached to them. The main discharge electrodes 23, 24 start the main discharge for discharge excitation of the laser gas.

Furthermore, the auxiliary electrodes 31, 32 are respectively arranged at the upstream sides of the laser gas of the discharge tubes 21, 22 from the main discharge electrodes 23, 24. These auxiliary electrodes 31, 32 start auxiliary discharge in the laser gas in a state lower than the output at which the main discharge is started.

The auxiliary electrodes 31, 32 and the main discharge electrodes 23, 24 of the discharge tubes 21, 22 are supplied with the same voltages through matching units. The auxiliary discharges by the auxiliary electrodes 31, 32 usually occur at voltages lower than the voltage which is applied to the main discharge electrodes 23, 24, so even if the main discharge between the main discharge electrodes 23, 24 extinguishes, the auxiliary discharge is maintained. In this way, when the auxiliary discharge is maintained, even if the command to the laser power supply is rapidly raised, the discharge tube voltage can be kept from excessively rising and damage to the laser power supply can be prevented.

As shown in FIG. 1, the main discharge electrodes 23, 24 and auxiliary electrodes 31, 32 are connected through matching units 15, 16 to the laser power supply 11, 12. Two laser power supply 11, 12 are connected to a common output command device 10. Further, the output command device 10 is connected to a CNC 5. Further, the laser power sensor 36 is connected to the output command device 10. The detected value thereof is supplied to the output command device 10.

Furthermore, as shown in FIG. 1, in the front of the output mirror 30, a mechanical shutter 35 is arranged. When laser light is output from the output mirror 30, the output command device 10 makes the mechanical shutter 35 open. Due to this, the laser light reaches the workpiece (not shown) and can process the workpiece. When the output mirror 30 does not output laser light, the output command device 10 closes the mechanical shutter 35. The timing of opening and closing the mechanical shutter 35 is judged by the output command device 10 based on the content of the operating program of the CNC 5.

FIG. 2 is a time chart of the mechanical shutter and base discharge command of the gas laser oscillator according to the present invention. Below, while referring to FIG. 2 and the above-mentioned FIG. 3A to FIG. 3C, the operation of the gas laser oscillator 20 of the present invention will be explained.

Figure 3B:
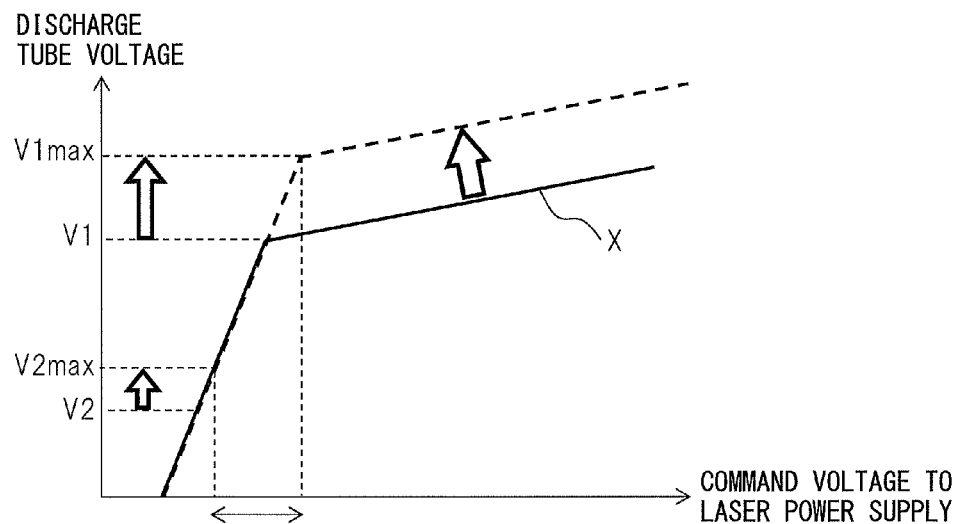
FIG. 3B is a view which shows a relationship between a command voltage to a laser power supply and a discharge tube voltage in a state where the gas laser oscillator is cold.

When the output command device 10 judges based on the content of the operating program that currently laser processing should not be performed, the mechanical shutter 35 is in a closed state. When the mechanical shutter 35 is closed, the laser light is not output, so the temperature of the gas laser oscillator 20 is believed to be relatively low. Therefore, as shown in FIG. 3B, the main discharge extinction level V1 rises to the main discharge extinction level V1max.

For this reason, in this case, the base discharge command V is set to a predetermined first command value A1 between the main discharge extinction level V1max and the main discharge extinction level V1min. As will be understood from FIG. 2 etc., the main discharge extinction level V1min is larger than the auxiliary discharge extinction level V2max. Therefore, if setting the base discharge command V to the first command value A1, even if the gas laser oscillator 20 is in a cold state, it is possible to secure auxiliary discharge with an extra margin and prevent auxiliary discharge from extinguishing. Of course, in a not shown embodiment, the first command value A1 may be a value between the main discharge extinction level V1max and the auxiliary discharge extinction level V2max.

Figure 3C:
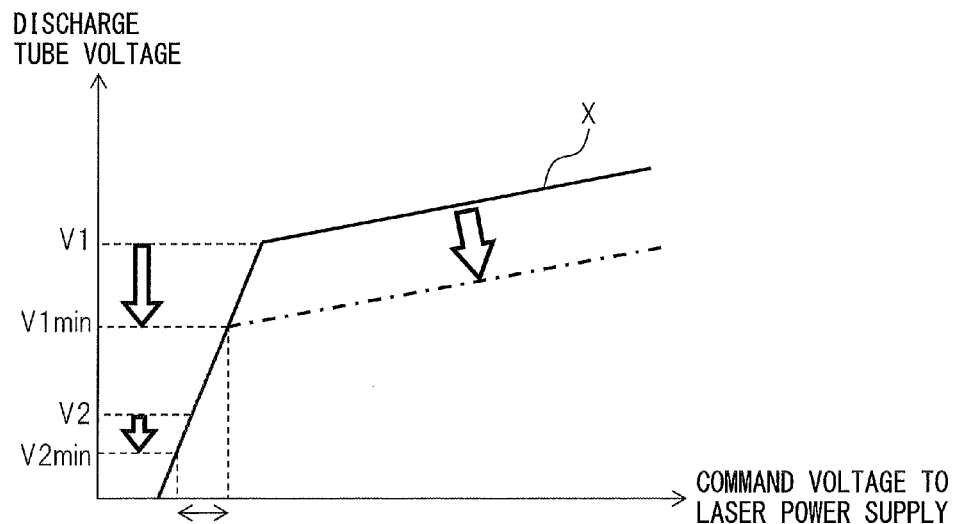
FIG. 3C is a view which shows a relationship between a command voltage to a laser power supply and a discharge tube voltage in a state where the gas laser oscillator is warm.

Further, when the output command device 10 judges that currently laser processing should be performed, it opens the mechanical shutter 35 and outputs laser light from the gas laser oscillator 20 to process the workpiece (not shown). When the mechanical shutter 35 opens, laser light is output, so the temperature of the gas laser oscillator 20 is believed to be relatively high. Therefore, as shown in FIG. 3C, the main discharge extinction level V1 falls to the main discharge extinction level V1min.

For this reason, in this case, the base discharge command V is set to a predetermined second command value A2 between the main discharge extinction level V1min and the auxiliary discharge extinction level V2max. The second command value A2 is smaller than the above-mentioned first command value A1. Therefore, if setting the base discharge command V to the second command value A2, even if the gas laser oscillator 20 is in a warm state, the electric shutter can be reliably realized.

In this way, in the present invention, when the mechanical shutter 35 is closed, that is, when laser processing is not being performed, the base discharge command V is set to the first command value A1, while when the mechanical shutter 35 is opened, that is, when laser processing is being performed, the base discharge command V is set to the second command value A2. For this reason, even in the state where the gas laser oscillator 20 is cold, the auxiliary discharge can be maintained, while even in the state where the gas laser oscillator 20 is warm, the electric shutter can be realized and processing defects can be prevented.

Furthermore, in the present invention, the hardware and software for synchronization of the base discharge command V and the laser output command are unnecessary. Further, the power source for auxiliary electrode use also becomes unnecessary. For this reason, in the present invention, the gas laser oscillator 20 can be provided at a relatively low cost.

Furthermore, in the present invention, the first command value and second command value are selected without use of a temperature sensor for detecting the temperature of the gas laser oscillator 20. Therefore, it will be learned that the gas laser oscillator 20 becomes more simply configured and additional costs can be kept down. Note that, when the detection value of the temperature sensor is smaller than a predetermined threshold value, the first command value may be selected, while when it is a predetermined threshold value or more, the second command value may be selected. Even such cases are considered to be included in the present invention.

ADVANTAGEOUS EFFECTS OF INVENTION

In the first and second aspects, when the mechanical shutter is closed, that is, when laser processing is not performed, the base discharge command is set to the first command value, while when the mechanical shutter is opened, that is, when laser processing is performed, the base discharge command is set to the second command value. For this reason, even if the oscillator is cold, auxiliary discharge can be maintained, while even if the oscillator is warm, it is possible to realize an electric shutter and prevent the occurrence of processing defects. Further, the latch circuit and power source for auxiliary electrode use are unnecessary, so a gas laser oscillator can be provided at relatively low cost.

Typical embodiments were used to explain the present invention, but a person skilled in the art would understand that the above-mentioned changes and various other changes, deletions, and additions may be made without departing from the scope of the present invention.

What is claimed is:

1. A gas laser oscillator comprising
a plurality of discharge tubes through which a laser gas circulates,
a plurality of main discharge electrodes which are arranged corresponding to the plurality of discharge tubes and which make main discharge start for discharge excitation of said laser gas,
a plurality of auxiliary electrodes which are arranged adjoining the plurality of main discharge electrodes and which make auxiliary discharge start in said laser gas in a state lower than the output by which said main discharge starts,
an output mirror which outputs a laser which is oscillated at said plurality of discharge tubes, and
a mechanical shutter which cuts off the laser output from the output mirror, wherein
a base command for maintaining said auxiliary discharge in the state where the laser output is zero is set to a first command value when said mechanical shutter is closed, and is set to a second command value smaller than said first command value when said mechanical shutter is opened.

2. The gas laser oscillator according to claim 1 wherein
said first command value is a value between a maximum value and a minimum value of a main discharge extinction level, and
said second command value is a value between a minimum value of a main discharge extinction level and a maximum value of an auxiliary discharge extinction level.

* * * * *